United States Patent
Schreck et al.

(10) Patent No.: US 11,970,262 B2
(45) Date of Patent: Apr. 30, 2024

(54) AIRCRAFT WING AND CONNECTION ASSEMBLY FOR A HIGH LIFT ASSEMBLY

(71) Applicant: Airbus Operations GmbH, Hamburg (DE)

(72) Inventors: Tobias Schreck, Achim (DE); Bernhard Schlipf, Bremen (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 73 days.

(21) Appl. No.: 17/734,734

(22) Filed: May 2, 2022

(65) Prior Publication Data
US 2022/0348308 A1 Nov. 3, 2022

(30) Foreign Application Priority Data
May 3, 2021 (EP) .................................... 21171905

(51) Int. Cl.
*B64C 13/34* (2006.01)
*B64C 9/02* (2006.01)
*B64C 9/22* (2006.01)

(52) U.S. Cl.
CPC ................. *B64C 13/34* (2013.01); *B64C 9/02* (2013.01); *B64C 9/22* (2013.01)

(58) Field of Classification Search
CPC ............ B64C 9/02; B64C 13/28; B64C 13/34
See application file for complete search history.

(56) References Cited

U.S. PATENT DOCUMENTS

| 4,838,503 A | * | 6/1989 | Williams | ................ B64C 13/34 244/214 |
| 4,971,267 A | * | 11/1990 | Fulton | ....................... F16D 9/08 74/665 F |
| 5,966,997 A | | 10/1999 | Halm et al. | |
| 8,276,842 B2 | * | 10/2012 | Kracke | ................... B64C 13/28 244/99.2 |
| 10,822,072 B2 | * | 11/2020 | Schlipf | .................... B64C 9/24 |

(Continued)

FOREIGN PATENT DOCUMENTS

| DE | 4113504 A1 | * | 11/1992 | ............ B64C 13/28 |
| DE | 102014019134 A1 | * | 6/2016 | ............ B64C 13/34 |

(Continued)

OTHER PUBLICATIONS

Extended European Search Report for EP Application No. 21171905.9 dated Oct. 28, 2021, 8 pages.

*Primary Examiner* — Joseph W Sanderson
(74) *Attorney, Agent, or Firm* — Nixon & Vanderhye P.C.

(57) ABSTRACT

A wing for an aircraft is disclosed having a main wing, a high lift body, and a connection assembly movably connecting the high lift body to the main wing, such that the high lift body can be moved between a retracted position and at least one extended position. The connection assembly includes a drive system having a first drive unit and a second drive unit, wherein the first drive unit has a first input section coupled to a drive shaft, a first gear unit and a first output section drivingly coupled to a first connection element. The second drive unit has a second input section coupled to the drive shaft, a second gear unit, and a second output section drivingly coupled to a second connection element. The first output section includes a first output wheel and the second output section includes a second output wheel.

19 Claims, 5 Drawing Sheets

(56) References Cited

U.S. PATENT DOCUMENTS

| | | | |
|---|---|---|---|
| 10,859,123 B2* | 12/2020 | Cristina | F16D 7/10 |
| 11,034,435 B2* | 6/2021 | Schlipf | B64C 9/02 |
| 11,136,111 B2* | 10/2021 | Schlipf | B64C 13/28 |
| 11,505,304 B2* | 11/2022 | Tsai | B64C 9/06 |
| 11,566,657 B2* | 1/2023 | Kiełbowicz | B64C 13/28 |
| 11,713,107 B2* | 8/2023 | Schlipf | B64C 9/02 244/123.1 |
| 11,807,366 B2* | 11/2023 | Schlipf | B64C 9/22 |
| 2011/0001015 A1* | 1/2011 | Kracke | B64C 9/02 244/99.3 |
| 2012/0080557 A1* | 4/2012 | Rodrigues | B64C 13/30 244/99.3 |
| 2018/0273161 A1* | 9/2018 | Schlipf | B64C 13/22 |
| 2018/0281927 A1* | 10/2018 | Schlipf | B64C 9/22 |
| 2018/0355921 A1* | 12/2018 | Cristina | F16D 7/10 |
| 2019/0193837 A1* | 6/2019 | Schlipf | B64C 13/28 |
| 2020/0347875 A1* | 11/2020 | Kiełbowicz | F16C 1/02 |
| 2021/0114714 A1* | 4/2021 | Tsai | B64C 9/06 |
| 2022/0017211 A1* | 1/2022 | Schlipf | B64C 9/02 |
| 2022/0219808 A1* | 7/2022 | Schlipf | B64C 13/38 |
| 2022/0324548 A1* | 10/2022 | Winkelmann | B64C 9/02 |
| 2022/0348307 A1* | 11/2022 | Schreck | B64C 3/38 |
| 2022/0388629 A1* | 12/2022 | Schlipf | B64C 9/24 |
| 2023/0002033 A1* | 1/2023 | Schlipf | B64C 9/02 |

FOREIGN PATENT DOCUMENTS

| | | |
|---|---|---|
| EP | 0 291 328 | 11/1988 |
| EP | 3 501 978 | 6/2019 |
| WO | 90/09314 | 8/1990 |

\* cited by examiner

AIRCRAFT WING AND CONNECTION ASSEMBLY FOR A HIGH LIFT ASSEMBLY

CROSS REFERENCE TO RELATED APPLICATION

This application claims priority to European Application Number EP21171905.9, filed May 3, 2021, the entire contents of which is hereby incorporated by reference.

BACKGROUND

The present invention relates to a wing for an aircraft, comprising a main wing and a high lift assembly. Further aspects of the invention relate to a high lift assembly for such a wing, as well as to an aircraft comprising such a wing and/or comprising such a high lift assembly.

The high lift assembly, which might be a leading edge high lift assembly or a trailing edge high lift assembly, comprises a high lift body, and a connection assembly for movably connecting the high lift body to the main wing, such that the high lift body can be moved relative to the main wing between a retracted position and at least one extended position. The high lift body is preferably formed as a slat or a droop nose in case of a leading edge high lift assembly and is preferably formed as a flap in case of a trailing edge high lift assembly.

The connection assembly comprises a first connection element, such as a first track or a first linkage, and a second connection element, such as a second track or a second linkage. The first connection element is movably mounted to the main wing and is mounted, preferably fixedly and/or directly mounted, to the high lift body. The second connection element is movably mounted to the main wing and is mounted, preferably fixedly and/or directly mounted, to the high lift body in a position spaced apart from the first connection element in a wing span direction.

Further, the connection assembly comprises a drive system that is provided at, preferably fixedly mounted to, the main wing and that is connected to, preferably indirectly connected to, the high lift body for driving, i.e. initiating movement, of the high lift body between the retracted position and the extended position. The drive system comprises a first drive unit and a second drive unit spaced apart from one another in the wing span direction. The first drive unit is preferably formed as a geared rotary actuator (GRA) and has a first input section coupled to a drive shaft, a first gear unit, and a first output section drivingly coupled to the first connection element. The second drive unit is preferably formed as a geared rotary actuator (GRA) and has a second input section coupled to the drive shaft, a second gear unit, and a second output section drivingly coupled to the second connection element. The first and second gear units preferably transform high rotational speed with low torque from the first and second input sections, i.e. from the drive shaft, into low rotational speed with high torque at the first and second output sections. The first output section comprises a first output wheel and the second output section comprises a second output wheel. First and second output wheels are preferably formed as pinions.

Such wings are known in the art. For the wings known in the art, skew cases are possible, where the first and second connection elements or the first and second drive units do not move in sync and the high lift body might be skewed about a vertical axis. If one of the first and second connection elements is blocked or moves slower than the other, e.g. due to failure of the related first or second drive unit, the other one of the first and second connection elements driven by the still intact drive unit might be experiencing high torque loads and transferring these to the high lift body while skewed.

SUMMARY

The present invention contemplated preventing excessively high torque loads during such skew cases of the high lift body.

The present disclosure contemplates that the first output wheel is coupled to the first gear unit via a first torsional element for transferring torque from the first gear unit to the first output wheel for driving the first output wheel. Additionally or alternatively, the second output wheel is coupled to the second gear unit via a second torsional element for transferring torque from the second gear unit to the second output wheel for driving the first output wheel. The coupling via the first torsional element and/or via the second torsional element does not necessarily be a direct coupling but might also be an indirect coupling via further elements. The first torsional element and/or the second torsional element have a non-linear torsional force-displacement characteristic, i.e. a non-linear torque-torsion characteristic. By such torsional elements the force-displacement characteristic can be adapted such that torque loads occurring during skew cases of the high lift body can be limited in an efficient way.

At a maximum displacement, i.e., at a maximum skew of the high lift body, the corresponding torque is lower than in case of a linear force-displacement characteristic. Also, sizing loads for the high lift assembly can be essentially reduced.

According to an exemplary embodiment, the torsional force-displacement characteristic of the first torsional element and/or of the second torsional element may have a higher slope at lower forces, or below a predetermined threshold torque, and has a lower slope at higher forces, or above the threshold torque. In such a way, the maximum torque load occurring during skew of the high lift body can be efficiently reduced.

According to an exemplary embodiment, the torsional force-displacement characteristic of the first torsional element and/or of the second torsional element is linear, i.e. has a constant first slope, for forces below a threshold torque. For forces above the threshold torque the torsional force-displacement characteristic of the first torsional element and/or of the second torsional element is non-linear, i.e. has at least one second slope different from the first slope. However, this does not mean that there necessarily needs to be a kink at the threshold torque. Rather, the transition from the first slope to the second slope might be smooth and continuous. In such a way, the maximum torque load occurring during skew of the high lift body can be efficiently reduced.

The threshold torque may be between 100% and 150%, or may be between 110% and 130%, or may be at about 120%, of the maximum torque occurring during normal operation when both the first drive unit and the second drive unit are intact. The first slope may be at least 5 times higher, or may be at least 10 times higher, or may be at least 20 times higher, yet may be at least 50 times higher, or may be at least 100 times higher than the second slope. In such a way, above the threshold torque there is only very little further increase in torque with increasing torsion. However, the second slope might also be zero or might be negative, so that the torque is constant or is decreasing after the threshold is reached.

Also, it is possible that there is a third slope after the second slope which might be positive, negative, or zero.

According to an exemplary embodiment, the first torsional element and/or the second torsional element have a non-linear torsional force-displacement characteristic with respect to torque applied to extend the high lift body, i.e. to move the high lift body from the retracted position to the extended position. At the same time, the first torsional element and/or the second torsional element have a linear, preferably entirely linear, torsional force-displacement characteristic with respect to torque applied to retract the high lift body, i.e. to move the high lift body from the extended position to the retracted position. Such a force-displacement characteristic is particularly advantageous for leading edge high lift assemblies.

According to an exemplary embodiment, the first torsional element and/or the second torsional element have a non-linear torsional force-displacement characteristic with respect to both torque applied to extend the high lift body and torque applied to retract the high lift body. Such a force-displacement characteristic is particularly advantageous for trailing edge high lift assemblies.

According to an exemplary embodiment, the first torsional element and/or the second torsional element is formed as or comprises a shaft, a rod or a tube, preferably made of a metal material. The form and/or material of first torsional element and/or second torsional element may be adapted to realize the non-linear torsional force-displacement characteristic. This can be done in various ways, e.g. by a specific reinforcement structure or a hybrid or composite material.

The first torsional element and/or the second torsional element may be in the form of a helical torsion tube, in particular a double helical torsion tube with counter-directional helices, which might be rigid or flexible, extending along a torsion axis between a first end and an opposite second end and between the first and second ends having a plurality of first windings, in particular one or more helically wound strips, and a plurality of second windings, in particular one or more helically wound strips. The first and second windings are wound in opposite directions, so that the first windings regularly intersect the second windings, where the first and second windings are preferably joined or interlaced, i.e. braided. The first windings have a significantly greater, preferably at least two times greater, more preferred at least five times greater, most preferred about 10 times greater, diameter or a significantly greater, preferably at least two times greater, more preferred at least five times greater, most preferred about 10 times greater, strength than the second windings. By such a helical torsion tube the non-linear torsional force-displacement characteristic can be efficiently realized.

When the helical torsion tube is loaded by torsion, the second windings first deform elastically and at the threshold torque fail or deform plastically. In particular, when the helical torsion tube is loaded by torsion in one direction, the second windings are loaded by tension, wherein when the helical torsion tube is loaded in the opposite direction, the second windings are loaded by compression. The second windings loaded with compression usually fail by buckling and thus fail at a significantly lower loading than the second windings loaded with tension, which usually fail by tensile fracture. This asymmetric behaviour of the helical torsion tube can be used in such a way that the non-linear torsional force-displacement characteristic is non-linear only in one direction, i.e. only for those forces applied to extend the high lift body or for those forces applied to retract the high lift body, preferably for those forces applied to extend the high lift body. This means the helical torsion tube is preferably installed such that the second windings are under compression when the high lift body is moved to an extended position and are under tension when the high lift body is moved to a retracted position.

Further, the second windings may have the same pitch, i.e. the same winding angle, as the first windings. In such a way, the second windings intersect the first windings at an angle of 90°, which leads to a purely linear and bending-free loading of the second windings upon torsion of the helical torsion tube.

Alternatively, the second windings have a different pitch, i.e. a different winding angle, as the first windings. In such a way, the second windings intersect the first windings at an angle different from 90°, which leads to an introduction of additional bending loads into the second windings upon torsion of the helical torsion tube. By such additional bending loads, buckling upon compression of the second windings can be enhanced and accelerated, which might be used to tailor the threshold torque.

The helical torsion tube may be in the form of a rigid tube, in particular having rigid windings, or in the form of a flexible hose, in particular having first and second windings in the form of strings. Both rigid and flexible forms of the helical torsion tube are generally possible and have the same or similar function. At least in case of the helical torsion tube being in the form of a flexible hose, the first and second windings in the form of strings are in a braided form interlacing at the intersections. In case of the helical torsion tube being in the form of a rigid tube, the rigid windings are preferably joined, i.e. integrally formed, at the intersections, but might also be in a braided form interlacing at the intersections.

According to an exemplary embodiment, the first torsional element and/or the second torsional element is formed as or comprises a disc or a plate, preferably extending in a plane perpendicular to its torsion axis, and preferably made of a metal material or a plastic or composite material. Preferably, the form and/or material of first torsional element and/or second torsional element is adapted to realize the non-linear torsional force-displacement characteristic. Preferably, the first torsional element and/or second torsional element is provided with specific reinforcements that realize the non-linear force-displacement characteristic, e.g. by failing of the reinforcements at the threshold torque. Failing in this connection might include e.g. fracturing, buckling, or plastically deforming. Such a disk or plate does not require much space and enables to realize a very precise non-linear torsional force-displacement characteristic.

According to an exemplary embodiment, the non-linear torsional force-displacement characteristic of the first torsional element and/or the second torsional element is due to elastic deformation only. E.g., two elastically deformed components are provided which are both loaded below the threshold torque while only one of which is loaded when loads increase above the threshold torque. Alternatively, the non-linear torsional force-displacement characteristic of the first torsional element and/or the second torsional element is due to a combination of elastic deformation and plastic deformation. E.g., only elastic deformation is present below the threshold torque and plastic deformation alone or combined with elastic deformation is present when loads increase above the threshold torque.

According to an exemplary embodiment, the high lift assembly is a leading edge high lift assembly and the high lift body is a leading edge high lift body, such as a slat or a droop nose. The non-linear torsional force-displacement characteristic of the first torsional element and/or the second torsional element is particularly advantageous at the leading edge.

According to an exemplary embodiment, the high lift assembly is a trailing edge high lift assembly and the high lift body is a trailing edge high lift body, such as a flap, which might be driven e.g. by a ball-screw actuator. The non-linear torsional force-displacement characteristic of the first torsional element and/or the second torsional element is also advantageous at the trailing edge.

According to an exemplary embodiment, the first connection element is formed as a first track that is movably guided at the main wing and that is preferably fixedly mounted to the high lift body. Preferably, the first output wheel is formed as a first pinion drivingly engaging a first toothed rack at the surface of the first track. Additionally or alternatively, the second connection element is formed as a second track that is movably guided at the main wing and that is preferably fixedly mounted to the high lift body. Preferably, the second output wheel is formed as a second pinion drivingly engaging a second toothed rack at the surface of the first track. The first track and/or the second track may be in the form of an elongate support beam that is movable along the direction of its elongate extension, such as a slat track. Such a rack-and-pinion drive is a very compact and efficient drive of the first and second tracks.

According to an exemplary embodiment, the first connection element is formed as a first linkage. The first linkage comprises a first drive arm preferably fixedly coupled to the first output wheel and at least one first link element rotatably coupled to the first drive arm and coupled to the high lift body. Additionally or alternatively, the second connection element is formed as a second linkage. The second linkage comprises a second drive arm preferably fixedly coupled to the second output wheel and at least one second link element rotatably coupled to the second drive arm and coupled to the high lift body.

According to an exemplary embodiment, the connection assembly comprises one or more further connection elements in the form of a track or in the form of a linkage. The connection assembly may comprise two further connection elements that are non-driven. Such further connection elements might be required or advantageous for guiding and supporting the high lift body.

A further aspect of the present invention relates to a high lift assembly for the wing according to any of the afore-described embodiments. The high lift assembly comprises a high lift body and a connection assembly for movably connecting the high lift body to a main wing, such that the high lift body can be moved between a retracted position and at least one extended position. The connection assembly comprises a first connection element and a second connection element. The first connection element is configured to be movably mounted to the main wing and is mounted to the high lift body. The second connection element is configured to be movably mounted to the main wing and is mounted to the high lift body in a position spaced apart from the first connection element in a wing span direction. The connection assembly comprises a drive system that is configured to be mounted to the main wing and that is connected to the high lift body for driving the high lift body between the retracted position and the extended position. The drive system comprises a first drive unit and a second drive unit spaced apart from one another in the wing span direction. The first drive unit has a first input section coupled to a drive shaft, a first gear unit and a first output section drivingly coupled to the first connection element. The second drive unit has a second input section coupled to the drive shaft, a second gear unit, and a second output section drivingly coupled to the second connection element. The first output section comprises a first output wheel and the second output section comprises a second output wheel. The first output wheel is coupled to the first gear unit via a first torsional element for transferring torque from the first gear unit to the first output wheel for driving the first output wheel. Additionally or alternatively, the second output wheel is coupled to the second gear unit via a second torsional element for transferring torque from the second gear unit to the second output wheel for driving the first output wheel. The first torsional element and/or the second torsional element have a non-linear torsional force-displacement characteristic, i.e. a non-linear torque-torsion characteristic. Features and effects explained further above in connection with the wing apply vis-à-vis also in case of the high lift assembly.

A further aspect of the present invention relates to an aircraft comprising a wing according to any of the afore-described embodiments and/or comprising a high lift assembly according to any of the afore-described embodiments. Features and effects explained further above in connection with the wing and with the high lift assembly apply vis-à-vis also in case of the aircraft.

BRIEF DESCRIPTION OF THE DRAWINGS

For an understanding of embodiments of the disclosure, reference is now made to the following description taken in conjunction with the accompanying drawings, in which.

DETAILED DESCRIPTION OF SOME EMBODIMENTS

Some embodiments will now be described with reference to the Figures.

Figure 1:
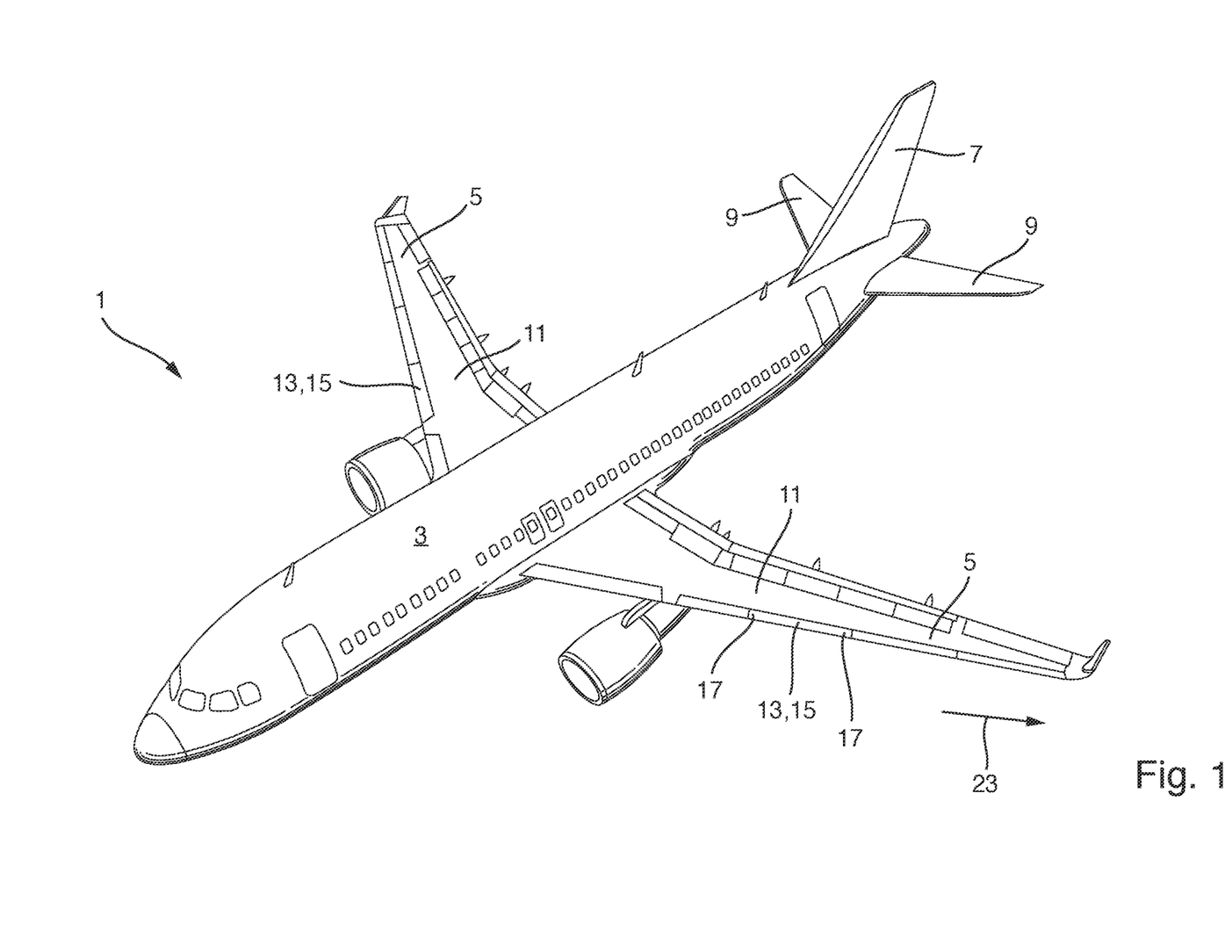
FIG. 1 is a perspective view of an aircraft according to an exemplary embodiment of the invention.
Figure 2:
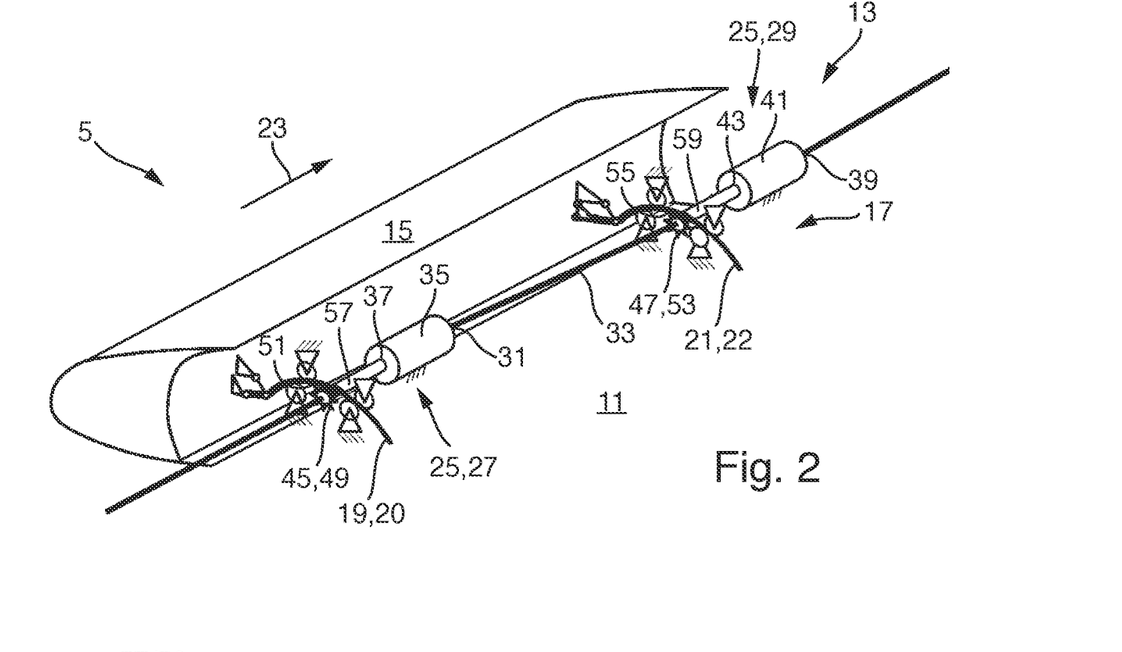
FIG. 2 is a perspective schematic view of a wing according to an embodiment of the invention.
Figure 3:
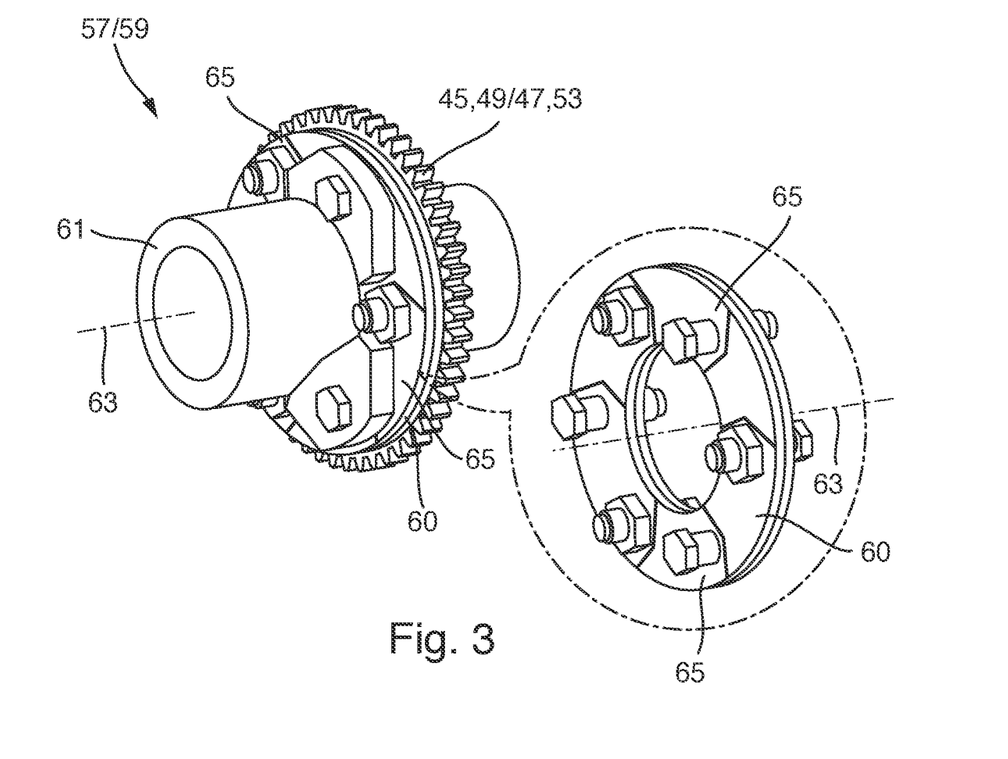
FIG. 3 is a perspective view of an exemplary first or second torsional element as used in the wing of FIG. 2.

In FIG. 1 an embodiment of an aircraft 1 according to the present invention is illustrated. The aircraft 1 comprises a fuselage 3, wings 5, a vertical tail plane 7 and a horizontal tail plane 9. FIGS. 2 and 3 show details of the wings 5 of the aircraft 1.

FIG. 2 shows an embodiment of the wing 5 according to the invention. The wing 5 comprises a main wing 11 and a high lift assembly 13, in the present embodiment formed as a leading edge high lift assembly, movable relative to the main wing 11 to increase lift of the wing 5. The high lift assembly 13 comprises a high lift body 15 and a connection assembly 17. The high lift body 15 in the present embodiment is a leading edge high lift body, namely a slat. The connection assembly 17 is configured for connecting the high lift body 15 to the leading edge of the main wing 11 in such a way that the high lift body 15 is movable relative to the main wing 11 between a retracted position and at least one extended position.

The connection assembly 17 comprises a first connection element 19 and a second connection element 21. The first connection element 19 is movably mounted to the main wing 11 and is fixedly mounted to the high lift body 15. The second connection element 21 is movably mounted to the main wing 5 and is fixedly mounted to the high lift body 15 in a position spaced apart from the first connection element 19 in a wing span direction 23.

Further, the connection assembly 17 comprises a drive system 25 that is fixedly mounted to the main wing 11 and that is connected to the high lift body 15 for driving the high lift body 15 between the retracted position and the extended position. The drive system 25 comprises a first drive unit 27 and a second drive unit 29 spaced apart from one another in the wing span direction 23. The first drive unit 27 is formed as a geared rotary actuator (GRA) and has a first input section 31 coupled to a drive shaft 33, a first gear unit 35, and a first output section 37 drivingly coupled to the first connection element 19. The second drive unit 29 is formed as a geared rotary actuator (GRA) and has a second input section 39 coupled to the drive shaft 33, a second gear unit 41, and a second output section 43 drivingly coupled to the second connection element 21. The first and second gear units 35, 41 transform high rotational speed with low torque from the first and second input sections 31, 39, i.e. from the drive shaft 33, into low rotational speed with high torque at the first and second output sections 37, 43. The first output section 37 comprises a first output wheel 45 and the second output section 43 comprises a second output wheel 47.

The first connection element 19 is formed as a first track 20 that is movably guided at the main wing 11 and that is fixedly mounted to the high lift body 15. The first output wheel 45 is formed as a first pinion 49 drivingly engaging a first toothed rack 51 at the surface of the first track 20. Additionally, the second connection element 21 is formed as a second track 22 that is movably guided at the main wing 11 and that is fixedly mounted to the high lift body 15. The second output wheel 47 is formed as a second pinion 53 drivingly engaging a second toothed rack 55 at the surface of the first track 20. The first track 20 and the second track 22 are in the form of a slat track, i.e. in the form of an elongate support beam that is movable along the direction of its elongate extension.

The first output wheel 45 is coupled to the first gear unit 35 via a first torsional element 57 for transferring torque from the first gear unit 35 to the first output wheel 45 for driving the first output wheel 45. Additionally, the second output wheel 47 is coupled to the second gear unit 41 via a second torsional element 59 for transferring torque from the second gear unit 41 to the second output wheel 47 for driving the second output wheel 47. The first torsional element 57 and the second torsional element 59 have a non-linear torsional force-displacement characteristic 62, i.e. a non-linear torque-torsion characteristic.

As shown in FIG. 3, the first torsional element 57 and the second torsional element 59 are formed as a disc 60 mounted to a tubular shaft 61 and extending in a plane perpendicular to its torsion axis 63 while the shaft 61 is coaxial with the torsion axis 63. The disc 60 is fixedly mounted to the respective first or second output wheel 45, 47 in an abutting manner, while the shaft 61 is drivingly coupled to the respective first or second gear unit 35, 41. The disc 60 and the shaft 61 are made of a metal material. FIG. 3a shows the shaft 61 and the disc 60 as mounted to the first or second output wheel 45, 47. FIG. 3b shows the disc 60 in an isolated view. The form and the material of the first torsional element 57 and of the second torsional element 59 are adapted to realize the non-linear torsional force-displacement characteristic 62. As shown in FIG. 3b, the disc 60 is provided with specific reinforcements 65 that realize the non-linear force-displacement characteristic 62, in the present embodiment by failing of the reinforcements 65 at a predetermined threshold torque $M_{threshold}$. Thus, non-linear torsional force-displacement characteristic 62 of the first torsional element 57 and of the second torsional element 59 is due to a combination of elastic deformation and plastic deformation. Specifically, when loading the disc 60 and the shaft 61 below the threshold torque $M_{threshold}$, only elastic deformation is present. When loading the disc 60 and the shaft 61 with torque above the threshold torque $M_{threshold}$, plastic deformation of the disc is predominant, specifically by failing of the reinforcements 65.

Figure 4:
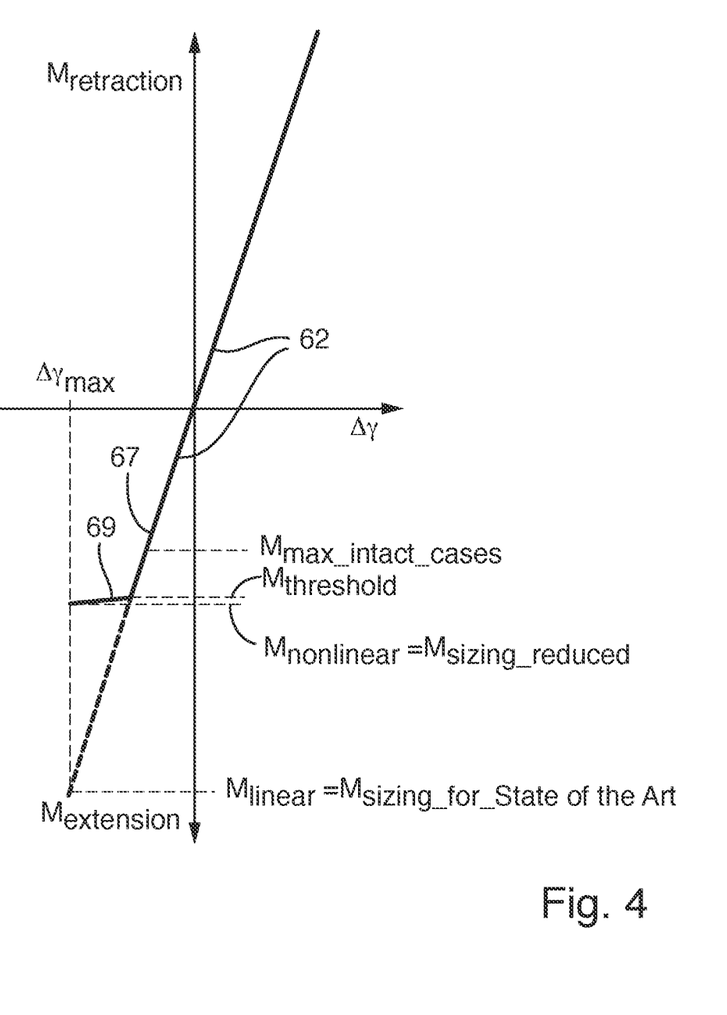
FIG. 4 is a plot of an exemplary force-displacement characteristic of the first or second torsional element shown in FIG. 3.

As illustrated in FIG. 4, the torsional force-displacement characteristic 62 of the first torsional element 57 and of the second torsional element 59 has a higher slope at lower forces below the threshold torque $M_{threshold}$ and has a lower slope at higher forces above the threshold torque $M_{threshold}$. The torsional force-displacement characteristic 62 of the first torsional element 57 and of the second torsional element 59 is linear, i.e. has a constant first slope 67, for forces below a threshold torque $M_{threshold}$. For forces above the threshold torque $M_{threshold}$ the torsional force-displacement characteristic 62 of the first torsional element 57 and of the second torsional element 59 is non-linear, i.e. has a second slope 69 different from the first slope 67. In the present embodiment, the threshold torque $M_{threshold}$ is about 120% of the maximum torque $M_{max\_intaet\_cases}$ occurring during normal operation when both the first drive unit 27 and the second drive unit 29 are intact, which as illustrated in FIG. 4 in the present embodiment is between 90% and 95%, of the maximum torque $M_{non-linear}$ associated with a maximum torsional displacement $\Delta\gamma_{max}$ of the first or second torsional element 57, 59 at a corresponding maximum skew displacement of the high lift body 15. In the present embodiment shown in FIG. 4, the first slope 67 is about 50 times higher than the second slope 69. As shown in FIG. 4, the first torsional element 57 and the second torsional element 59 have a non-linear torsional force-displacement characteristic 62 with respect to torque applied to extend the high lift body 15, i.e. to move the high lift body 15 from the retracted position to the extended position. At the same time, the first torsional element 57 and the second torsional element 59 have a linear torsional force-displacement characteristic 62 with respect to torque applied to retract the high lift body 15, i.e. to move the high lift body 15 from the extended position to the retracted position.

Figure 5:
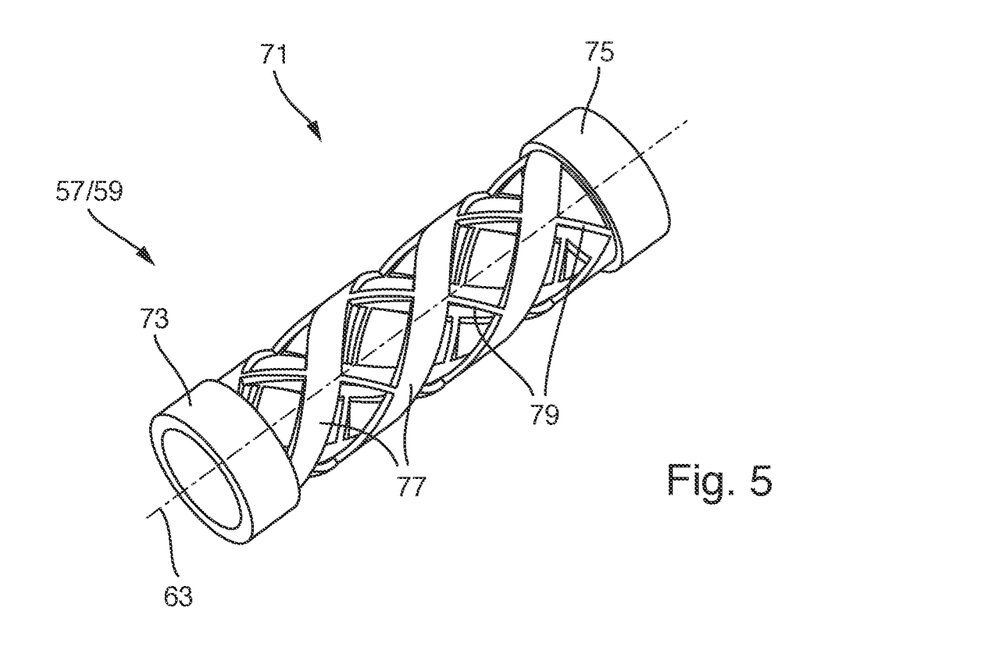
FIG. 5 is a perspective view of an embodiment of a first or second torsional element as used in the wing of FIG. 2.
Figure 6:
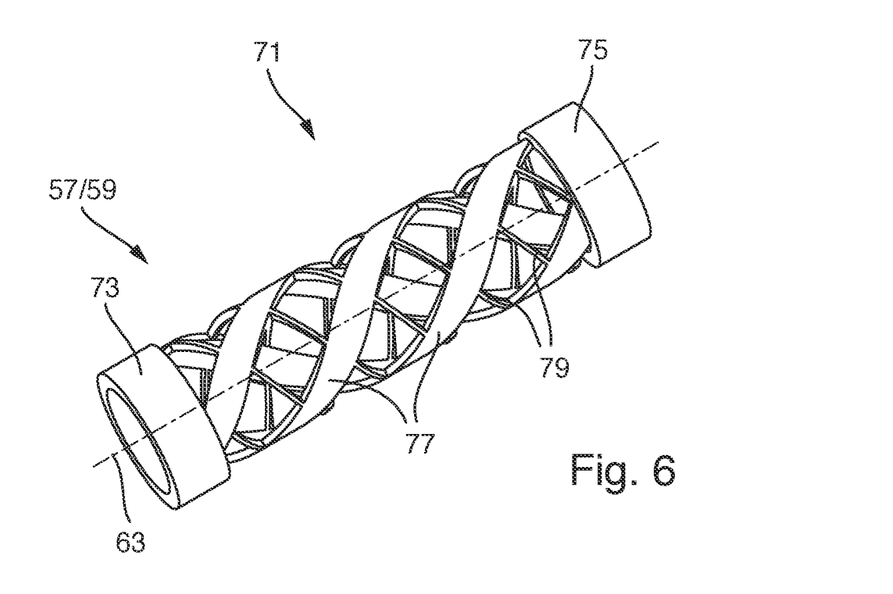
FIG. 6 is a perspective view of an embodiment of a first or second torsional element as used in the wing of FIG. 2; and, FIG. 7 is a perspective view of an embodiment of a first or second torsional element as used in the wing of FIG. 2.
Figure 7:
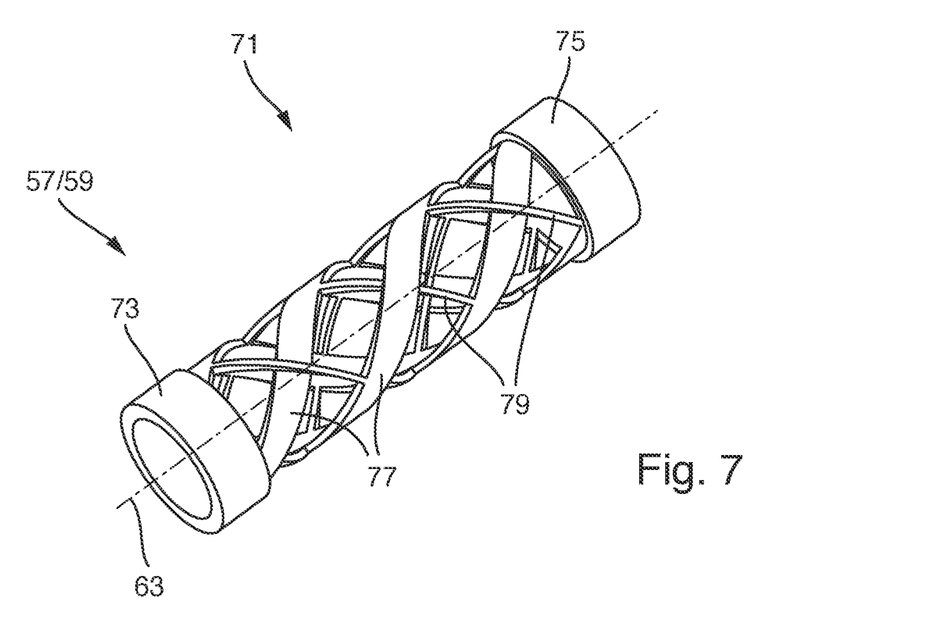

FIGS. 5 to 7 show two further embodiments of the first and second torsional element 57, 59. As shown in FIGS. 5 to 7, the first torsional element 57 and the second torsional element 59 are in the form of a helical torsion tube 71 extending along a torsion axis 63 between a first end 73 and an opposite second end 75, and between the first and second ends 73, 75 having a plurality of first windings 77 and a plurality of second windings 79. The first and second windings 77, 79 are wound in opposite directions, so that the first windings 77 regularly intersect the second windings 79. In the embodiments shown in FIGS. 5 and 6, the first and second windings 77, 79 are integrally joined at the intersections, while in the embodiment shown in FIG. 7 the first and second windings 77, 79 are interlaced at the intersections. The first windings 77 have a significantly greater diameter, in the present embodiments about 10 times greater diameter, or a significantly greater strength, in the present embodiment about 10 times greater strength, than the second windings 79. When the helical torsion tube 71 is loaded by torsion, the second windings 79 first deform elastically and at the threshold torque deform plastically or fail. In the present embodiment, when the helical torsion tube 71 is loaded by torsion in one direction, the second windings 79 are loaded by tension, wherein when the helical torsion tube 71 is loaded by torsion in the opposite direction, the second windings 79 are loaded with compression. The second windings 79 loaded with compression usually fail by buckling and thus fail at a significantly lower loading than the second windings 79 loaded with tension. This asymmetric behaviour of the helical torsion tube 71 is used in such a way that the non-linear torsional force-displacement characteristic 62 is non-linear only for those forces applied to move the high lift body 15 to the extended position, as shown in FIG. 4. The helical torsion tube 71 is installed such that the second windings 79 are under compression when the high lift body 15 is moved to an extended position and are under tension when the high lift body is moved to a retracted position.

The embodiments shown in FIGS. 5 and 6 differ from one another in so far as in the embodiment of FIG. 5 the second windings 79 have the same pitch as the first windings 77, and thus intersect the first windings 77 at an angle of 90°, while in the embodiment of FIG. 6 the second windings 79 have a different pitch as the first windings 77, and thus intersect the first windings 77 at an acute angle below 90°.

In the embodiments shown in FIGS. 5 and 6, the helical torsion tube 71 is in the form of a rigid tube having rigid windings integrally joined at intersections. In other embodiments the helical torsion tube 71 might also be in the form of a flexible hose with braided first and second windings 77, 79 that are interlaced at the intersections, as shown in FIG. 7.

By such a wing 5 the force-displacement characteristic 62 of the first and second torsional elements 57, 59 can be adapted such that torque loads occurring during skew cases of the high lift body 15 can be limited in an efficient way. Also, sizing loads $M_{sizing}$ for the high lift assembly can be essentially reduced.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising:
a main wing,
a high lift assembly comprising
a high lift body, and
a connection assembly movably connecting the high lift body to the main wing, such that the high lift body can be moved between a retracted position and at least one extended position,
wherein the connection assembly comprises a first connection element and a second connection element,
wherein the first connection element is movably mounted to the main wing and is mounted to the high lift body, and
wherein the second connection element is movably mounted to the main wing and is mounted to the high lift body in a position spaced apart from the first connection element in a wing span direction,
wherein the connection assembly comprises a drive system that is mounted to the main wing and connected to the high lift body for driving the high lift body between the retracted position and the extended position,
wherein the drive system comprises a first drive unit and a second drive unit spaced apart from one another in the wing span direction,
wherein the first drive unit has a first input section coupled to a drive shaft, a first gear unit and a first output section drivingly coupled to the first connection element, and
wherein the second drive unit has a second input section coupled to the drive shaft, a second gear unit, and a second output section drivingly coupled to the second connection element,
wherein the first output section comprises a first output wheel and the second output section comprises a second output wheel,
wherein the first output wheel is coupled to the first gear unit via a first torsional element, and/or
the second output wheel is coupled to the second gear unit via a second torsional element, and
the first torsional element and/or the second torsional element have a non-linear torsional force-displacement characteristic.

2. The wing according to claim 1, wherein the torsional force-displacement characteristic of the first torsional element and/or of the second torsional element has a higher slope at lower forces and has a lower slope at higher forces.

3. The wing according to claim 1, wherein the torsional force-displacement characteristic of the first torsional element and/or of the second torsional element is linear for forces below a threshold torque ($M_{threshold}$),
wherein for forces above the threshold torque ($M_{threshold}$), the torsional force-displacement characteristic of the first torsional element and/or of the second torsional element is non-linear.

4. The wing according to claim 3, wherein the threshold torque ($M_{threshold}$) is between 100% and 150%, of the maximum torque ($M_{max\_intact\_cases}$) occurring during normal operation when both the first drive unit and the second drive unit are intact.

5. The wing according to claim 1, wherein the first torsional element and/or the second torsional element characteristic is applied to extend the high lift body,
wherein the first torsional element and/or the second torsional element characteristic is applied to retract the high lift body.

6. The wing according to claim 1, wherein the first torsional element and/or the second torsional element characteristic is with respect to both torque applied to extend the high lift body and torque applied to retract the high lift body.

7. The wing according to claim 1, wherein the first torsional element and/or the second torsional element is formed as or comprises a shaft, a rod or a tube.

8. The wing according to claim 7, wherein the first torsional element and/or the second torsional element is in the form of a helical torsion tube having a first end and a second end and between the first and second ends having a plurality of first windings and a plurality of second windings,
wherein the first and second windings are wound in opposite directions, so that the first windings regularly intersect the second windings, and
wherein the first windings have a greater diameter or a greater strength than the second windings.

9. The wing according to claim 8, wherein the second windings have the same pitch as the first windings.

10. The wing according to claim 8, wherein the second windings have a different pitch as the first windings.

11. The wing according to claim 8, wherein the helical torsion tube is in the form of a rigid tube or in the form of a flexible hose.

12. The wing according to claim 1, wherein the first torsional element and/or the second torsional element is formed as or comprises a disc or a plate.

13. The wing according to claim 1, wherein the non-linear torsional force-displacement characteristic of the first torsional element and/or the second torsional element are due to elastic deformation only or due to a combination of elastic deformation and plastic deformation.

14. The wing according to claim 1, wherein the high lift assembly is a leading edge high lift assembly and the high lift body is a leading edge high lift body.

15. The wing according to claim 1, wherein the high lift assembly is a trailing edge high lift assembly and the high lift body is a trailing edge high lift body.

16. The wing according to claim 1, wherein the first connection element is formed as a first track that is movably guided at the main wing and that is mounted to the high lift body, and
wherein the first output wheel is formed as a first pinion drivingly engaging a first toothed rack at the first track, and/or
wherein the second connection element is formed as a second track that is movably guided at the main wing and that is mounted to the high lift body, and
wherein the second output wheel is formed as a second pinion drivingly engaging a second toothed rack at the first track.

17. The wing according to claim 1, wherein the first connection element or the second element is in the form of a track or in the form of a linkage.

18. A high lift assembly for a wing, comprising:
a high lift body, and
a connection assembly for movably connecting the high lift body to a main wing, such that the high lift body can be moved between a retracted position and at least one extended position,
wherein the connection assembly comprises a first connection element and a second connection element,
wherein the first connection element is configured to be movably mounted to the main wing and is mounted to the high lift body, and
wherein the second connection element is configured to be movably mounted to the main wing and is mounted to the high lift body in a position spaced apart from the first connection element in a wing span direction,
wherein the connection assembly comprises a drive system that is configured to be mounted to the main wing and that is connected to the high lift body for driving the high lift body between the retracted position and the extended position,
wherein the drive system comprises a first drive unit and a second drive unit spaced apart from one another in the wing span direction,
wherein the first drive unit has a first input section coupled to a drive shaft, a first gear unit and a first output section drivingly coupled to the first connection element, and
wherein the second drive unit has a second input section coupled to the drive shaft, a second gear unit, and a second output section drivingly coupled to the second connection element,
wherein the first output section comprises a first output wheel and the second output section comprises a second output wheel,
wherein the first output wheel is coupled to the first gear unit via a first torsional element, and/or
the second output wheel is coupled to the second gear unit via a second torsional element, and
the first torsional element and/or the second torsional element have a non-linear torsional force-displacement characteristic.

19. An aircraft comprising a wing according to claim 1.

* * * * *